Figure 1:
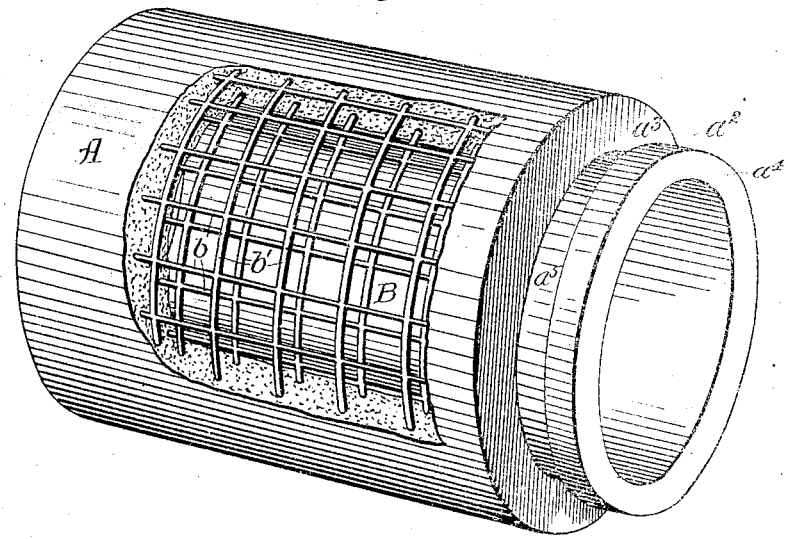

H. R. McMAHON.
REINFORCED CONCRETE PIPE STRUCTURE.
APPLICATION FILED JUNE 15, 1907.

912,318.

Patented Feb. 16, 1909.

2 SHEETS—SHEET 1.

Witnesses:
Lena A. Dirlam
Sadie E. Gott

Inventor:
Harry R. McMahon,
by A. E. Merkel
his attorney

H. R. McMAHON.
REINFORCED CONCRETE PIPE STRUCTURE.
APPLICATION FILED JUNE 15, 1907.
912,318.
Patented Feb. 16, 1909.
2 SHEETS—SHEET 2.
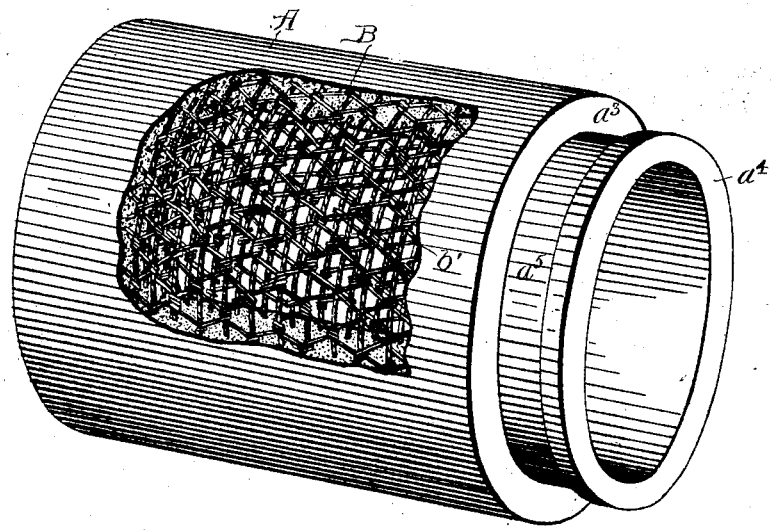
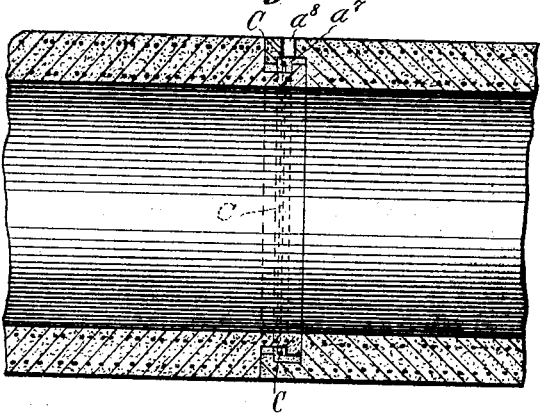
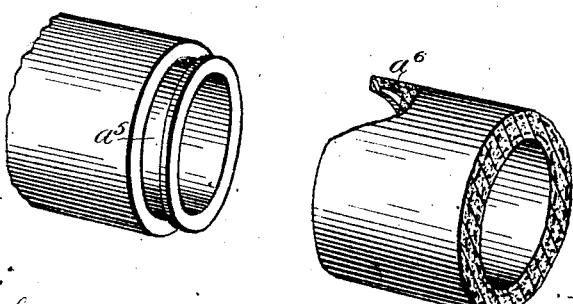
Witnesses:
Lena A. Dirlam.
Sadie E. Gott.
Inventor:
Harry R. McMahon,
by A. C. Merkel.
his attorney.

UNITED STATES PATENT OFFICE.

HARRY R. McMAHON, OF CLEVELAND, OHIO.

REINFORCED CONCRETE PIPE STRUCTURE.

No. 912,318.

Specification of Letters Patent.

Patented Feb. 16, 1909.

Application filed June 15, 1907. Serial No. 379,161.

*To all whom it may concern:*

Be it known that I, HARRY R. McMAHON, a citizen of the United States, resident of Cleveland, county of Cuyahoga, and State of Ohio, have invented a new and useful Improvement in Reinforced Concrete Pipe Structures, of which the following is a specification, the principle of the invention being herein explained and the best mode in which I have contemplated applying that principle so as to distinguish it from other inventions.

My invention relates to reinforced concrete pipe structures and methods of making the same, its object being to provide a pipe structure of this character which shall be economical in its manufacture and efficient in its use. The invention furthermore refers to that class of pipe structures which are formed by placing reinforcing hoops or bands of metal and metal tension members in an annular mold and then pouring concrete or cement in such mold to form the pipe section. It has heretofore been deemed essential that a pipe section constructed in this manner be provided with reinforcing tension members placed parallel with the axis of the section so as to reinforce the structure against rupture when it is placed under conditions of load such as to cause it to act as a beam supported at its two ends. The reinforcing rings or hoops are used to add to the strength of the section in resisting rupture when the load is acting at right angles to the axis of the section and the structure is supported at all points intermediate of its ends. I have found, however, that inasmuch as in almost all cases where concrete pipe structures of this character have been used, they are seldom called upon to act as a beam, and that therefore little stress if any need be laid upon the provision of the tension members in the structure. In this latter case the entire section may be considered as a series of adjacent concrete ring sections placed contiguous to each other each ring section being reinforced independently of the contiguous rings to resist a crushing load.

My invention consists of means hereinafter fully described and particularly set forth in the claims.

The annexed drawings and the following description set forth in detail, certain mechanism embodying the invention, the disclosed means constituting but one of various mechanical forms in which the principle of the invention may be applied.

Figure 2:
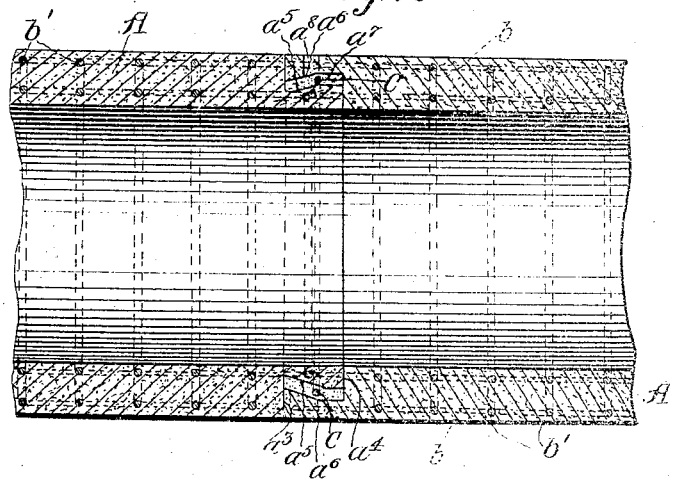
Figure 3:
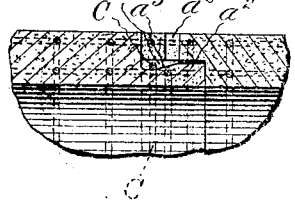

In said annexed drawings:—Figure 1 represents a perspective view of one end of a concrete pipe section, a part thereof being broken away to disclose a form of the embedded reinforcement. Fig. 2 represents an axial section of the two contiguous meeting ends of two sections, the joint formed embodying part of my invention. Fig. 3 represents a vertical axial section of a portion of the joined ends of such two sections, showing a modified form of joint. Fig. 4 represents a perspective view of one end of a section embodying my invention showing the structure used for a second modified form of joint, a part of the shell of the section being broken away to disclose another form of imbedded reinforcement which may be used. Fig. 5 represents an axial section of the ends of two contiguous pipe sections embodying the principles of my invention and illustrating a third and modified form of joint which may be used. Fig. 6 represents a perspective view of two detached sections of pipe embodying my invention, the form shown in this figure being that illustrated in Figs. 4 and 5.

Referring first to Figs. 1 and 2, the pipe section embodying the principle of my invention consists of the concrete shell A in which there is embedded a wire fabric B. This fabric may be any one of various forms of wire fabric known as wire fence and is first bent into a cylindrical form of the proper diameter and in a manner such that the tension members $b$ will form hoops or rings, the upright or stay members $b'$ of the fence structure merely serving to hold the hoops or rings in place while the concrete is being poured into the molds. It is to be understood that while the stay members $b'$, being placed in the above described position parallel with the axis of the section, would act as tension members reinforcing the structure when acting as a beam, this is merely incidental to the use of the wire fabric.

This wire fabric is readily obtainable in the market at a comparatively low cost. Furthermore it provides when bent as previously described, a series of reinforcing rings all connected together whereby all the rings so formed to be used in the concrete pipe may be placed in the mold at one time, thus greatly facilitating the work of assembling the pipe sections and reducing the amount of labor attendant thereon. A single reinforcing structure such as above described and embedded in the section provides a section embodying the advantages previously mentioned but in order to obtain a section having the greatest number of advantages I embed two of these cylindrical structures in each section, the one of larger diameter being placed near the outer edge of the shell of the section and the other being placed near the inner edge of said section. In this manner the tension side of the shell, no matter which portion thereof may be at the top or the bottom, is always reinforced, as will readily be understood by those skilled in the art.

In Fig. 4 I have shown a second form of fabric which may be used as reinforcing material, such form being that commonly known as wire or poultry-netting. As in the previously described structure this latter form of fabric is bent into cylindrical form so as to cause these members which were designed to act as tension members when used as a fence, to be bent into reinforcing rings. The use of manufactured fabric such as above described furthermore enables me to take advantage of the tensile strength of the material of which these fabrics are made, and also of the non-stretching qualities which this material possesses, it being well known that the wire used in the manufacture of fence, is, as a result of the process of its manufacture, possessed of a high degree of tensile strength and a comparatively great coefficient of elasticity, and will permit of very little stretching as compared with the tensile strength and coefficient of elasticity of rolled steel rods heretofore used for this purpose.

The manner of joining two pipe sections according to the principle of my invention may be effected in various ways, and as before stated Figs. 2 and 5 represent two different ways in which the joint may be formed. My preferred method however, of making this joint is that involving the structure shown in Fig. 2. According to this method the end of one section is reduced in diameter as at $a^2$ and intermediate of the shoulder $a^3$ and the extremity $a^4$ is formed a groove $a^5$ whose main surface is inclined to the axis of the section, that is made conical in outline. The opposite end of the same section is countersunk, such end of the contiguous pipe section being shown in Fig. 2.

Such countersunk portion is made of a diameter sufficient to admit the reduced end of the other section, and such countersunk portion is furthermore formed with a conical groove $a^6$ similar to that of $a^5$ of the other section. When these two sections are placed end to end as shown, the reduced end portion of the one and the countersunk portion of the other form an interior space $a^7$ which is entirely inclosed by the shells of the two sections. In this space is placed a reinforcing ring C and by means of a suitable aperture $a^8$ which may be either formed in the section or which may be made by breaking away a part of the end of the countersunk section end, the said space $a^7$ is filled with an indurating material such as cement or concrete. This material is allowed to set and thus effect the permanent connection of the two sections. By providing the inclined surface above described it will be seen that any effort to separate the two sections acting in the direction of their axes will tend to compress the binding concrete in the space $a^7$. This binding material having great resisting powers under compression it will be seen that such resistance will be very effective. The reinforcing fabric projects, as shown in dotted lines, into the overlapping portions of the two section ends, whereby it is seen that each such overlapping portion is reinforced as a ring. In this manner it will be seen that a very effective joint is made between the two sections.

In the modified form illustrated in Fig. 3 the reduced portion only is shown to be provided with a conical groove. In Figs. 5 and 6 I have as before stated illustrated a third form of joint. In this form the countersunk and reduced portions of the sections are provided with plain cylindrical grooves as shown, the joint so formed and the method of forming same being in other respects similar to that previously described.

Other modes of applying the principle of my invention may be employed, instead of the one explained and change may be made as regards the mechanism herein disclosed, provided the means covered by any one of the following claims be employed. I, therefore, particularly point out and distinctly claim as my invention:—

1. In a reinforced concrete pipe structure, the combination with two contiguous pipe sections, each having an inner and an outer cylindrical reinforcing member each made of wire fabric embedded in their respective shells; the end of one section overlapping and secured to the end of the other; the one outer reinforcing member projecting into and embedded in such overlapping portion of its corresponding section and the inner reinforcing member of the other section projecting into and embedded in the overlapped portion of the other section.

2. A pipe section comprising an annular shell of concrete having the exterior of one end reduced and the interior of the other end enlarged, and provided with reinforcement embedded in such concrete near its inner and near its outer surface, such outer reinforcement extending longitudinally into the interiorly enlarged shell-portion, and the inner reinforcement extending longitudinally into the exteriorly reduced shell portion.

Signed by me, this 13 day of June, 1907.

HARRY R. McMAHON.

Attested by—
  JENNIE E. GARY,
  LENA A. DISLAM.